(12) United States Patent
Wang et al.

(10) Patent No.: US 9,904,660 B1
(45) Date of Patent: Feb. 27, 2018

(54) NONPARAMETRIC METHOD FOR MEASURING CLUSTERED LEVEL OF TIME RANK IN BINARY DATA

(71) Applicant: Powerchip Technology Corporation, Hsinchu (TW)

(72) Inventors: Li-Chin Wang, Tainan City (TW); Ching-Ly Yueh, Hsinchu (TW); Chien-Chung Chen, Hsinchu (TW)

(73) Assignee: Powerchip Technology Corporation, Hsinchu (TW)

( * ) Notice: Subject to any disclaimer, the term of this patent is extended or adjusted under 35 U.S.C. 154(b) by 0 days.

(21) Appl. No.: 15/347,792

(22) Filed: Nov. 10, 2016

(30) Foreign Application Priority Data

Aug. 30, 2016 (TW) .............................. 105127768 A (51) Int. Cl.
*G06F 17/10* (2006.01)
*G06F 17/18* (2006.01)
(52) U.S. Cl.
CPC .................................... *G06F 17/18* (2013.01)
(58) Field of Classification Search
CPC ...................................................... G06F 17/18
USPC .......................................................... 708/304
See application file for complete search history.

(56) References Cited

U.S. PATENT DOCUMENTS

| | | |
|---|---|---|
| 5,757,954 A | 5/1998 | Kuan et al. |
| 7,937,234 B2 | 5/2011 | St. Pierre et al. |
| 2003/0078924 A1* | 4/2003 | Liechty ................... G06F 17/18 |
| 2004/0068413 A1* | 4/2004 | Musgrove .............. G06Q 30/02 |
| | | 705/1.1 |
| 2007/0239629 A1 | 10/2007 | Ling |
| 2011/0312522 A1 | 12/2011 | Tempst et al. |

FOREIGN PATENT DOCUMENTS

WO 2005069191 7/2005

OTHER PUBLICATIONS

"Office Action of Taiwan Counterpart Application," dated Feb. 17, 2017, p. 1-p. 5, in which the listed references were cited.

* cited by examiner

*Primary Examiner* — Tan V. Mai
(74) *Attorney, Agent, or Firm* — JCIPRNET (57) ABSTRACT

A nonparametric method for measuring a clustered level of time rank in binary data is provided. A sample set of engineering data is classified into a target group and a reference group, and a rank is set to each sample in a chronological order. A minimum rank and a maximum rank are obtained from the target group, by which a characteristic period is defined. In the characteristic period, an average rank values of the target group and an average rank value of the reference group are calculated. After creating a dummy sample set, the dummy sample set is incorporated into an analysis data set and a new rank is set based on a comparison result of the average rank value of the target group and the average rank value of the reference group, and the minimum rank and the maximum rank of the characteristic period to obtain adjusted test data. A Mann-Whitney U test is executed on the adjusted test data to obtain a clustered level index of time rank in binary data.

7 Claims, 6 Drawing Sheets

NONPARAMETRIC METHOD FOR MEASURING CLUSTERED LEVEL OF TIME RANK IN BINARY DATA

CROSS-REFERENCE TO RELATED APPLICATION

This application claims the priority benefit of Taiwan application serial no. 105127768, filed on Aug. 30, 2016. The entirety of the above-mentioned patent application is hereby incorporated by reference herein and made a part of this specification.

BACKGROUND OF THE INVENTION

Field of the Invention

The invention relates to a nonparametric method for measuring a clustered level of time rank in binary data.

Description of Related Art

A common method used in wafer foundries for detecting problematic categorical process parameters is to read the trend charts for observing the clustered level of the target group in time. However, it is considered inefficient to solely depend on workers to read charts. One method that is currently adopted for improving chart reading efficiency is commonality analysis, which is to classify binary data into a target group and a reference group for observing if any process parameter gathers most target groups and relatively few reference groups, i.e., common parameter.

In commonality analysis, however, two situations are not eligible for comparison. One is same common ratio (for example, several process parameters have the same number of target groups and reference groups) and the other is single process parameter. In the two situations, a common solution is to observe the clustered level of the target group in time by reading the trend charts. Nevertheless, it is rather inefficient to depend on workers to read the charts and subjective bias may occur from time to time, and currently there is no index for reflecting such situations.

SUMMARY OF THE INVENTION

The invention provides a nonparametric method for measuring a clustered level of time rank in binary data, by which, after characteristic acquisition and conversion of data, a Mann-Whitney U test (or called Wilcoxon Rank Sum test) is applied to obtain statistics to serve as a clustered level index of a target group in time.

The invention provides a nonparametric method for measuring a clustered level of time rank in binary data, which includes: classifying a sample set of engineering data into a target group and a reference group; setting a rank to each sample of the sample set in a chronological order; obtaining a minimum rank and a maximum rank from the target group and setting a characteristic period based on the minimum rank and the maximum rank, and incorporating the sample set included in the characteristic period into an analysis data set; calculating an average rank value of the target group and an average rank value of the reference group in the characteristic period; creating a dummy sample set; incorporating the dummy sample set into the analysis data set and setting a new rank to each sample of the analysis data set, based on a comparison result of the average rank value of the target group and the average rank value of the reference group and the minimum rank and the maximum rank of the characteristic period, to obtain adjusted data; and executing a Mann-Whitney U test on the adjusted data to obtain a clustered level index.

In an embodiment of the invention, a total of the number of samples of the dummy sample set and the number of the samples classified into the reference group in the characteristic period is equal to the number of the samples classified into the reference group in the engineering data.

In an embodiment of the invention, after the step of calculating the average rank value of the target group and the average rank value of the reference group in the characteristic period, the nonparametric method further includes: comparing the average rank value of the target group with the average rank value of the reference group to obtain the comparison result, so as to decide an order of the dummy sample set and the sample set included in the characteristic period based on the comparison result when incorporating the dummy sample set into the analysis data set.

In an embodiment of the invention, in the step of incorporating the dummy sample set into the analysis data set and setting the new rank to each sample of the analysis data set, the ranks of the sample set included in the characteristic period are reversed if the average rank value of the target group is greater than the average rank value of the reference group; and the dummy sample set is set to succeed the maximum rank of the reversed characteristic period and new ranks are set to obtain the adjusted data, wherein each of new ranks of the dummy sample set in the adjusted data is obtained by adding the maximum rank of the reversed characteristic period and each of initial rank of the dummy sample.

In an embodiment of the invention, in the step of incorporating the dummy sample set into the analysis data set and setting the new rank to each sample of the analysis data set, if the average rank value of the target group is greater than the average rank value of the reference group, the dummy sample set is set to be prior to the minimum rank of the characteristic period and new ranks are set to obtain the adjusted data, wherein new ranks of the dummy sample set in the adjusted data are set from 1, and new ranks of the characteristic period are set from a value obtained by adding 1 and maximum rank of dummy sample set in the adjusted data.

In an embodiment of the invention, in the step of incorporating the dummy sample set into the analysis data set and setting the new rank to each sample of the analysis data set, if the average rank value of the target group is smaller than the average rank value of the reference group, the dummy sample set is set to succeed the maximum rank of the characteristic period and new ranks are set to obtain the adjusted data, wherein each of new ranks of the dummy sample set in the adjusted data is obtained by adding the maximum rank of the characteristic period and each of initial rank of the dummy sample.

In an embodiment of the invention, in the step of incorporating the dummy sample set into the analysis data set and setting the new rank to each sample of the analysis data set, if the average rank value of the target group is equal to the average rank value of the reference group, the dummy sample set is set to succeed the maximum rank of the characteristic period and new ranks are set to obtain the adjusted data, wherein each of new ranks of the dummy sample set in the adjusted data is obtained by adding the maximum rank of the characteristic period and each of initial rank of the dummy sample, or the dummy sample set is set to be prior to the minimum rank of the characteristic period and new ranks are set to obtain the adjusted data, wherein new ranks of the dummy sample set in the adjusted data are set from 1, and new ranks of the characteristic period are set from a value obtained by adding 1 and maximum rank of dummy sample set in the adjusted data.

In an embodiment of the invention, after the step of setting the characteristic period based on the minimum rank and the maximum rank, if the characteristic period does not include the sample that belongs to the reference group, the dummy sample set is set to succeed the maximum rank of the characteristic period and new ranks are set to obtain the adjusted data, wherein each of new ranks of the dummy sample set in the adjusted data is obtained by adding the maximum rank of the characteristic period and each of initial rank of the dummy sample, or the dummy sample set is set to be prior to the minimum rank of the characteristic period and new ranks are set to obtain the adjusted data, wherein new ranks of the dummy sample set in the adjusted data are set from 1, and new ranks of the characteristic period are set from a value obtained by adding 1 and maximum rank of dummy sample set in the adjusted data.

Based on the above, in the nonparametric method for measuring the clustered level of time rank in binary data according to the invention, the order of the sample set of the engineering data is readjusted to be suitable for the nonparametric test (e.g., Mann-Whitney U test) that determines the difference between medians of two samples, so as to obtain the clustered level index of the binary data in time rank.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

The invention provides a nonparametric method for measuring a clustered level of time rank in binary data, by which, through characteristic acquisition and conversion of the data, a new analysis data set is used for calculating a P value of a Mann-Whitney U test (or called Wilcoxon Rank Sum test) to serve as a clustered level index. In order to make the disclosure of the invention more comprehensible, embodiments are described below as examples.

Figure 1:
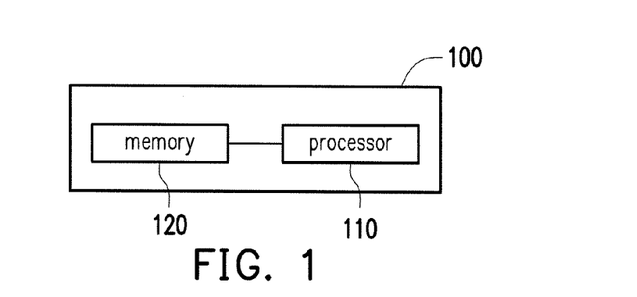
FIG. 1 is a block diagram of an electronic device according to an embodiment of the invention.

FIG. 1 is a block diagram of an electronic device according to an embodiment of the invention. Referring to FIG. 1, an electronic device 100 includes a processor 110 and a memory 120. The processor 110 is coupled to the memory 120. The processor 110 is a central processing unit (CPU), a programmable microprocessor, an embedded control chip, and so on, for example. The memory 120 is a stationary or movable random access memory (RAM) in any form, a read-only memory (ROM), a flash memory, a hard disc, other similar devices, or a combination of the foregoing, for example. The memory 120 stores a plurality of code snippets therein. The code snippets are executed by the processor 110 after being installed, so as to perform a nonparametric method for measuring a clustered level of time rank in binary data, as described hereinafter.

Figure 2:
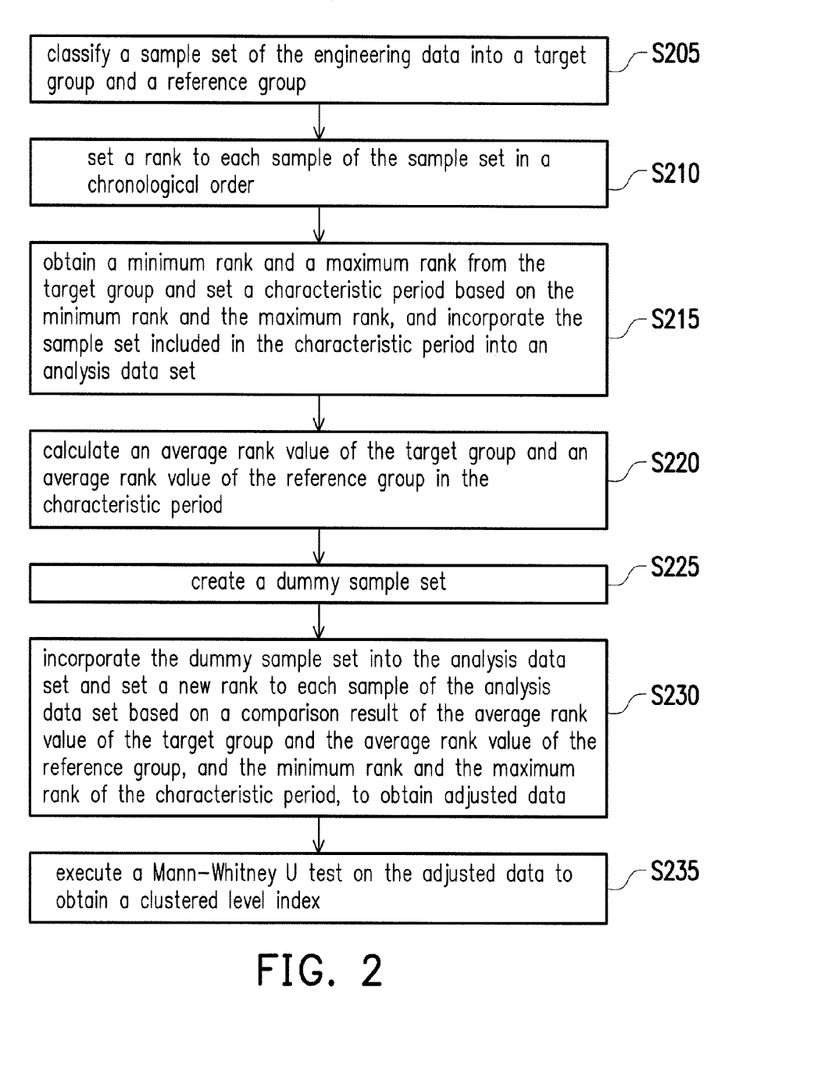
FIG. 2 is a flowchart illustrating a nonparametric method for measuring the clustered level of time rank in binary data according to an embodiment of the invention.

FIG. 2 is a flowchart illustrating the nonparametric method for measuring the clustered level of the binary data in time rank according to an embodiment of the invention. Referring to FIG. 1 and FIG. 2, in Step S205, the processor 110 classifies a sample set of engineering data into a target group and a reference group. For example, a user interface is provided for the user to select the target group and the reference group, a threshold value is set by the user, or a lot identity or a wafer identity of goods is inputted by the user, so as to carry out binary classification on each sample of the engineering data according to the user's selection for classifying the samples into the target group or the reference group. Here, the source of the engineering data includes a wafer bin map, a wafer acceptance test (WAT), in-line data, defect data, and so on, and analysis is performed on respective process parameter data. Common process parameter data comes from work in process (WIP), such as machines, formulas, and so on.

For example, the researcher may classify wafers into the target group and the reference group according to a failure pattern of the wafer bin map to draw a trend chart of zonal bin values for observing the performance difference of the sample set of the target group under the respective WIP parameters.

Figure 3A:
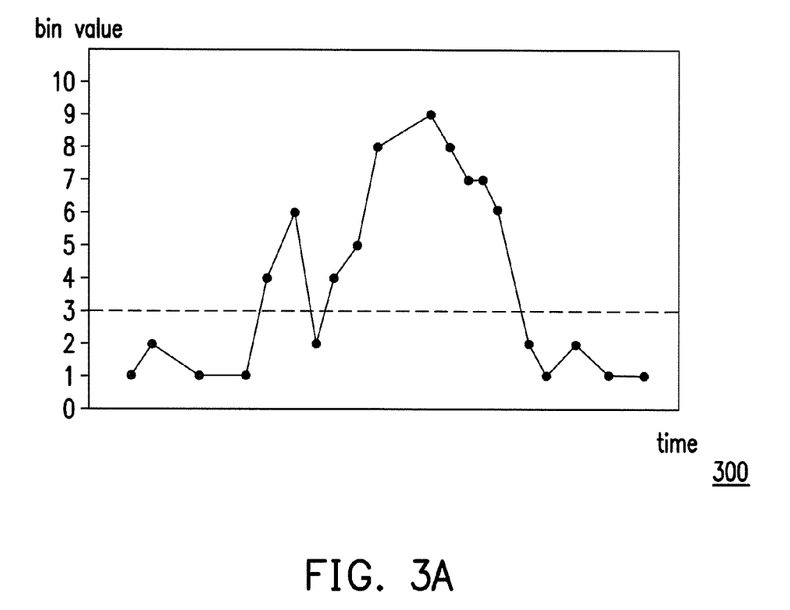
FIG. 3A is a trend chart of the engineering data according to an embodiment of the invention.

FIG. 3A is a trend chart of the engineering data according to an embodiment of the invention. In FIG. 3A, a trend chart 300 includes 20 samples, and the vertical axis represents the bin value corresponding to each sample while the horizontal axis represents time. Here, a sample with the bin value of 1 means that it has passed all functional tests. Chips with bin values of 2, 3, 4, and so on mean that certain failures occur, such as short circuit and so on. After obtaining the engineering data, the processor 110 further classifies the bin value of each sample into the target group or the reference group according to the user's selection.

Figure 3B:
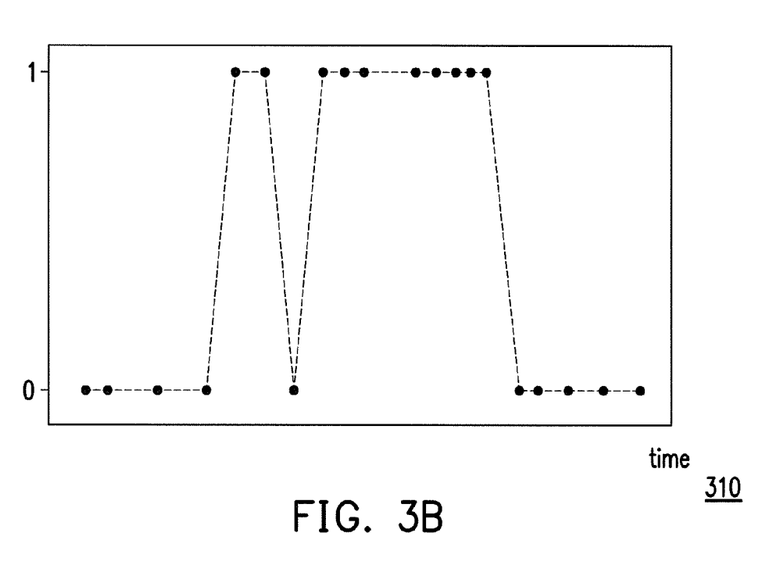
FIG. 3B is a trend chart, in which the engineering data to be analyzed is classified into binary data, i.e., the target group and the reference group, and converted into a Boolean value pattern according to an embodiment of the invention.

FIG. 3B is a trend chart, in which the engineering data to be analyzed is classified into binary data, i.e., the target group and the reference group, and converted into a Boolean value pattern according to an embodiment of the invention. In this embodiment, a value of the target group is defined as 1 while a value of the reference group is defined as 0. A trend chart 310 of FIG. 3B is obtained by performing binary classification on the trend chart 300. Referring to FIG. 3A and FIG. 3B, in this embodiment, the threshold value is set to 3. However, it should be noted that this threshold value is merely an example, and the invention is not limited thereto.

The threshold value may be set to 2 in some other embodiments, for example. Here, it is assumed that the target group is a bad lot and the reference group is a good lot. That is, the processor 110 compares the bin value corresponding to each sample with the threshold value and sets the sample with the bin value greater than or equal to the threshold value as the target group and sets the sample with the bin value smaller than the threshold value as the reference group.

Reverting to FIG. 2, in Step S210, the processor 110 sets a rank to each sample of the sample set in a chronological order. For example, it is assumed that there are 20 samples in total. The rank of the first sample is set as 1, the rank of the second sample is set as 2, the rank of the third sample is set as 3, and so forth in the chronological order.

Figure 4:
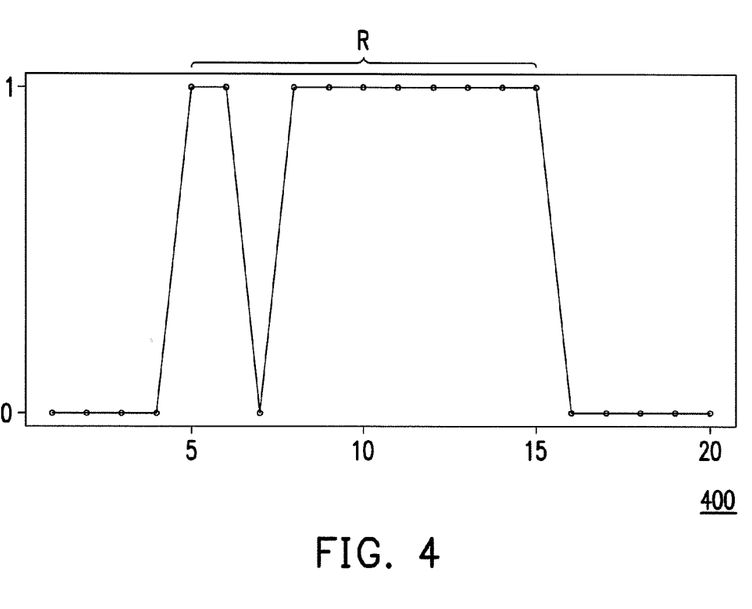
FIG. 4 is a trend chart of the engineering data that has been chronologically ranked according to an embodiment of the invention.

For example, FIG. 4 is a trend chart of the engineering data that has been chronologically ranked according to an embodiment of the invention. In this embodiment, the trend chart 310 of FIG. 3B, i.e., the sample set that has been binaryly classified, is taken as an example, and a rank is set to each sample in the chronological order to obtain a trend chart 400.

Then, in Step S215, the processor 110 obtains a minimum rank and a maximum rank from the target group and sets a characteristic period based on the minimum rank and the maximum rank, and incorporates the sample set included in the characteristic period into an analysis data set. Take the trend chart 400 of FIG. 4 for example, the minimum rank of all the samples of the target group is 5 and the maximum rank of all the samples of the target group is 15, and the characteristic period R is between ranks 5 to 15.

Next, in Step S220, the processor 110 calculates an average rank value of the target group and an average rank value of the reference group in the characteristic period. In Step S225, the processor 110 creates a dummy sample set.

Here, the created dummy sample set belongs to the reference group, and a total of the number of the samples of the dummy sample set and the number of the samples classified to the reference group in the characteristic period is equal to the number of the samples classified to the reference group in the engineering data. For example, it is assumed that the number of the samples belonging to the reference group in the engineering data is N, the number of the samples belonging to the reference group in the characteristic period is M, and the number of the samples of the dummy sample set is N-M. In addition, Step S225 may be performed before Step S220 or at the same time as Step S220, and Step S225 is not necessarily performed after Step S220.

After obtaining the average rank value of the target group and the average rank value of the reference group, in Step S230, the processor 110 incorporates the dummy sample set into the analysis data set and sets a new rank to each sample of the analysis data set based on a comparison result of the average rank value of the target group and the average rank value of the reference group, and the minimum rank and the maximum rank of the characteristic period, so as to obtain adjusted data.

Specifically, after obtaining the characteristic period, the processor 110 resets the rank corresponding to each sample in the characteristic period starting from 1, but not limited thereto. For example, B represents the target group and G represents the reference group, and it is assumed that the characteristic period includes 6 samples which are (B, B, G, B, G, B), and the ranks thereof are reset to (1, 2, 3, 4, 5, 6). Accordingly, the processor 110 calculates and determines that the average rank value of the target group is (1+2+4+6)/4 and the average rank value of the reference group is (3+5)/2. Thereafter, the processor 110 compares the average rank value of the target group with the average rank value of the reference group, so as to decide an order of the dummy sample set and the sample set included in the characteristic period when incorporating the dummy sample set into the analysis data set.

Then, in Step S235, the processor 110 executes a Mann-Whitney U test (or called Wilcoxon Rank Sum test) on the adjusted data to obtain a clustered level index. The Mann-Whitney U test (or called Wilcoxon Rank Sum test) is a nonparametric test for determining a difference between medians of two samples. That is, by the nonparametric test, i.e., Mann-Whitney U test (or called Wilcoxon Rank Sum test), the difference between the medians of the target group and the reference group is determined, so as to obtain the P value that serves as the clustered level index. A small P value indicates that the target group (e.g., bad lot) in the engineering data has a high clustered level in time rank; and a large P value indicates that the target group in the engineering data has a low clustered level in time rank.

The method of incorporating the dummy sample into the analysis data set is explained below based on different situations, for example.

If the characteristic period does not include all the sample that belongs to the reference group, the processor 110 determines the order of the newly added dummy sample set and the sample set of the characteristic period according to a predetermined setting. For example, the dummy sample set is set to succeed the maximum rank of the characteristic period and new ranks are reset to obtain the adjusted data, wherein each of new ranks of the dummy sample set in the adjusted data is obtained by adding the maximum rank of the characteristic period and each of initial rank of the dummy sample. Alternatively, the dummy sample set is set to be prior to the minimum rank of the characteristic period and new ranks are reset to obtain the adjusted data, wherein new ranks of the dummy sample set in the adjusted data are set from 1, and new ranks of the characteristic period are set from a value obtained by adding 1 and maximum rank of dummy sample set in the adjusted data.

For example, it is assumed that the number of the samples of the reference group is 10, and since the characteristic period does not include the sample that belongs to the reference group, the processor 110 creates 10 dummy samples. Moreover, the processor 110 directly sets the new ranks corresponding to the 10 dummy samples to succeed the maximum rank of the characteristic period, and then resets the corresponding new ranks starting from 1, so as to obtain the adjusted data. Furthermore, the processor 110 may set the new ranks corresponding to the 10 dummy samples to be prior to the minimum rank of the characteristic period, and then reset the corresponding new ranks starting from 1, so as to obtain the adjusted data.

In addition, if the characteristic period includes the sample that belongs to the reference group, the processor 110 determines the order of the newly added dummy samples and the samples of the characteristic period according to the comparison result of the average rank value of the target group and the average rank value of the reference group.

Figure 5A:
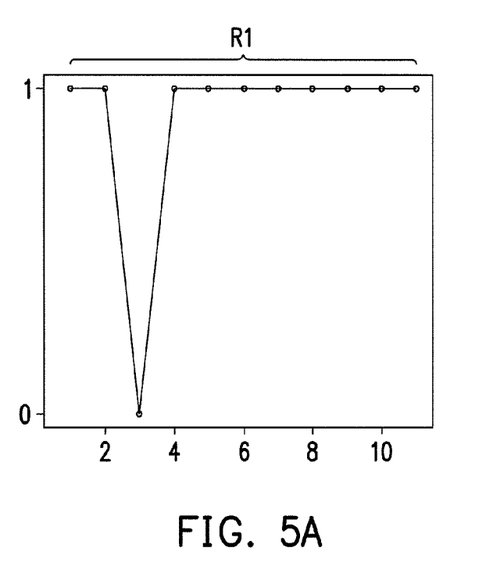
FIG. 5A to FIG. 5C are charts based on an analysis process of the trend chart according to an embodiment of the invention.
Figure 5B:
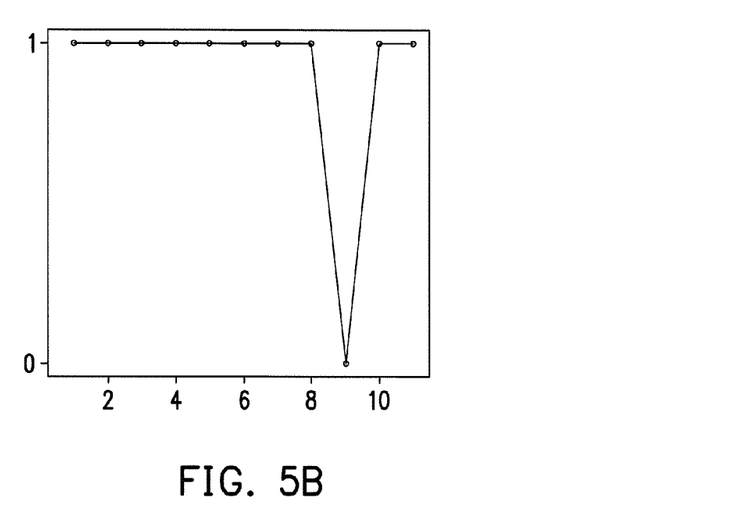
Figure 5C:
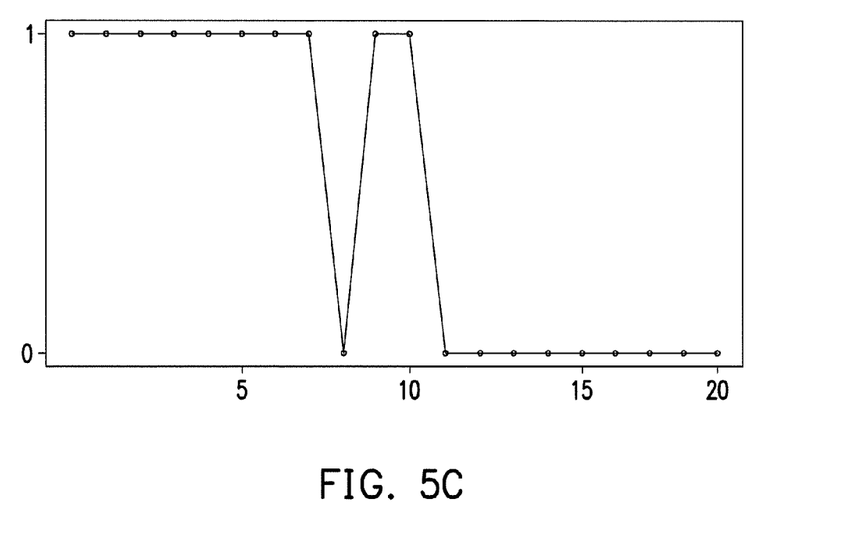

The trend chart 400 of FIG. 4 is described as an example. FIG. 5A to FIG. 5C are charts based on an analysis process of the trend chart according to an embodiment of the invention. In the trend chart 400, search is conducted on the ranks corresponding to the samples that belong to the target group to obtain that the minimum rank is 5 and the maximum rank is 15, so as to set the characteristic period R. The characteristic period R is extracted and the corresponding ranks are reset starting from 1 to obtain a characteristic period R1 as shown in FIG. 5A.

Here, B represents the target group and G represents the reference group. In FIG. 5A, the characteristic period R1 includes 11 samples which are (B, B, G, B, B, B, B, B, B, B, B), and the ranks thereof are reset to (1, 2, 3, 4, 5, 6, 7, 8, 9, 10, 11). Next, calculation is performed to determine that the average rank value of the target group in the characteristic period R1 is 63/9 and the average rank value of the reference group is 3. In the characteristic period R1, the average rank value of the target group is greater than the average rank value of the reference group.

Then, the ranks of the samples of the characteristic period R1 are reversed, as shown in FIG. 5B. That is, the sample ranked as 1 and the sample ranked as 11 in the characteristic period R1 are exchanged, the sample ranked as 2 and the sample ranked as 10 in the characteristic period R1 are exchanged, the sample ranked as 3 and the sample ranked as 9 in the characteristic period R1 are exchanged, and so forth. Here, the characteristic period R includes one sample of the reference group. Thus, 9 dummy samples are created. Next, as shown in FIG. 5C, new ranks corresponding to the dummy sample set (i.e., the 9 dummy samples) are set to succeed the maximum rank of the reversed characteristic period, and the new ranks are reset to obtain the adjusted data.

Figure 6:
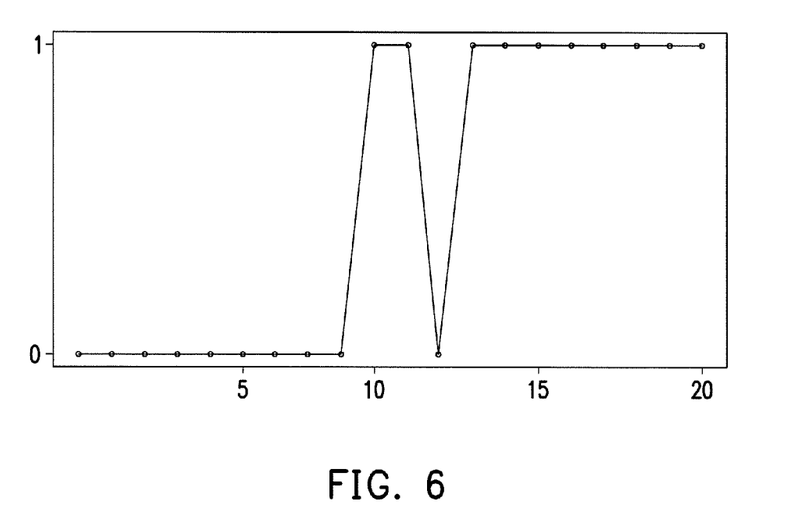
FIG. 6 is a trend chart of the adjusted data according to another embodiment of the invention.

In some other embodiments, the step of reversing the ranks of the samples in the characteristic period is omitted. For example, FIG. 6 is a trend chart of the adjusted data according to another embodiment of the invention. FIG. 6 is described with reference to FIG. 4. As shown in FIG. 6, new ranks corresponding to the dummy sample set are set to be prior to the minimum rank of the characteristic period R, and the new ranks are reset starting from 1, so as to obtain the adjusted data.

Figure 7A:
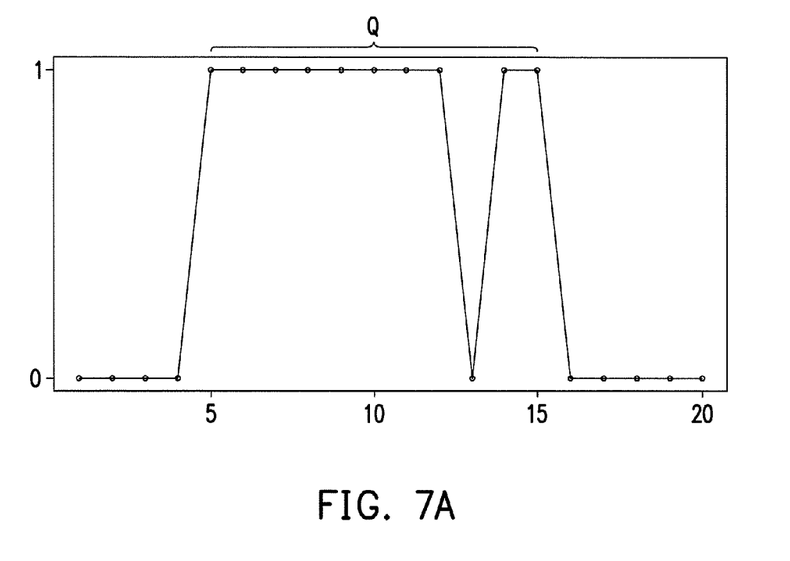
FIG. 7A to FIG. 7C are charts based on an analysis process of the trend chart according to another embodiment of the invention.
Figure 7B:
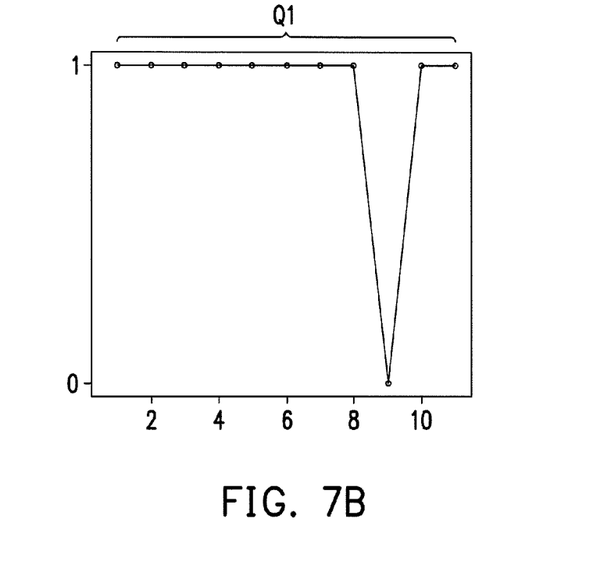
Figure 7C:
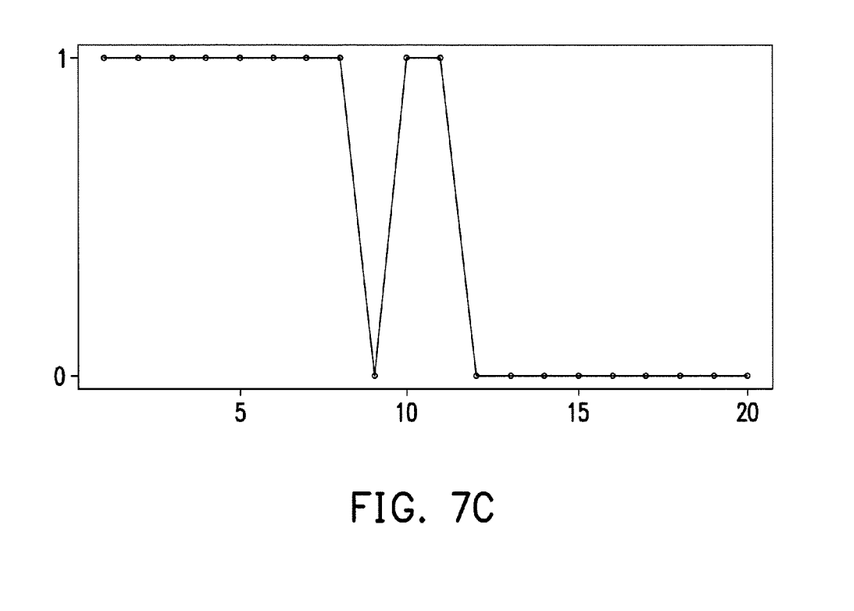

FIG. 7A to FIG. 7C are charts based on an analysis process of the trend chart according to another embodiment of the invention. In FIG. 7A, search is conducted on the ranks corresponding to the samples that belong to the target group to obtain that the minimum rank is 5 and the maximum rank is 15, so as to set a characteristic period Q. The characteristic period Q is extracted and the corresponding ranks are reset starting from 1 to obtain a characteristic period Q1 as shown in FIG. 7B. Next, calculation is performed to determine that the average rank value of the target group in the characteristic period Q1 is 57/9 and the average rank value of the reference group is 9. Since the average rank value of the target group is smaller than the average rank value of the reference group, as shown in FIG. 7C, new ranks corresponding to the dummy samples are set to succeed the maximum rank of the characteristic period Q1 to obtain the adjusted data.

In addition, if the characteristic period includes the sample that belongs to the reference group and the average rank value of the target group is determined equal to the average rank value of the reference group, the new ranks corresponding to the dummy samples are set to be prior to the minimum rank of the characteristic period or the new ranks corresponding to the dummy samples are set to succeed the maximum rank of the characteristic period, so as to obtain the adjusted data.

Accordingly, after obtaining the adjusted data by the aforementioned methods, the processor 110 executes the Mann-Whitney U test on the adjusted data to obtain the P value that serves as the clustered level index.

To sum up, in the data analysis method described above, the samples in the time period, which serve as the target group, are extracted and the created dummy samples are added, so as to readjust the order of the samples of the engineering data. Accordingly, the Mann-Whitney U test is executed on the adjusted data to determine the clustered level of time rank.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A nonparametric method for measuring a clustered level of time rank in binary data, the nonparametric method comprising:
    classifying a sample set of engineering data into a target group and a reference group;
    setting a rank to each sample of the sample set in a chronological order;
    obtaining a minimum rank and a maximum rank from the target group and setting a characteristic period based on the minimum rank and the maximum rank, and incorporating the sample set included in the characteristic period into an analysis data set;
    calculating an average rank value of the target group and an average rank value of the reference group in the characteristic period;
    creating a dummy sample set, wherein a total of the number of samples of the dummy sample set and the number of the samples classified into the reference group in the characteristic period is equal to the number of the samples classified into the reference group in the engineering data;
    incorporating the dummy sample set into the analysis data set and setting a new rank to each sample of the analysis data set, based on a comparison result of the average rank value of the target group and the average rank value of the reference group and the minimum rank and the maximum rank of the characteristic period, to obtain adjusted data; and
    executing a Mann-Whitney U test on the adjusted data to obtain a clustered level index.

2. The nonparametric method according to claim 1, wherein after the step of calculating the average rank value of the target group and the average rank value of the reference group in the characteristic period, the nonparametric method further comprises:
    comparing the average rank value of the target group with the average rank value of the reference group to obtain the comparison result, so as to decide an order of the dummy sample set and the sample set included in the characteristic period based on the comparison result when incorporating the dummy sample set into the analysis data set.

3. The nonparametric method according to claim 2, wherein the step of incorporating the dummy sample set into the analysis data set and setting the new rank to each sample of the analysis data set comprises:
    reversing the ranks of the sample set included in the characteristic period if the average rank value of the target group is greater than the average rank value of the reference group; and
    setting the dummy sample set to succeed the maximum rank of the reversed characteristic period and setting new ranks to obtain the adjusted data, wherein each of new ranks of the dummy sample set in the adjusted data is obtained by adding the maximum rank of the reversed characteristic period and each of initial rank of the dummy sample.

4. The nonparametric method according to claim 2, wherein the step of incorporating the dummy sample set into the analysis data set and setting the new rank to each sample of the analysis data set comprises:
  if the average rank value of the target group is greater than the average rank value of the reference group, setting the dummy sample set to be prior to the minimum rank of the characteristic period and setting new ranks to obtain the adjusted data, wherein new ranks of the dummy sample set in the adjusted data are set from 1, and new ranks of the characteristic period are set from a value obtained by adding 1 and maximum rank of dummy sample set in the adjusted data.

5. The nonparametric method according to claim 2, wherein the step of incorporating the dummy sample set into the analysis data set and setting the new rank to each sample of the analysis data set comprises:
  if the average rank value of the target group is smaller than the average rank value of the reference group, setting the dummy sample set to succeed the maximum rank of the characteristic period and setting new ranks to obtain the adjusted data, wherein each of new ranks of the dummy sample set in the adjusted data is obtained by adding the maximum rank of the characteristic period and each of initial rank of the dummy sample.

6. The nonparametric method according to claim 2, wherein the step of incorporating the dummy sample set into the analysis data set and setting the new rank to each sample of the analysis data set comprises:
  if the average rank value of the target group is equal to the average rank value of the reference group, setting the dummy sample set to succeed the maximum rank of the characteristic period and setting new ranks to obtain the adjusted data, wherein each of new ranks of the dummy sample set in the adjusted data is obtained by adding the maximum rank of the characteristic period and each of initial rank of the dummy sample, or setting the dummy sample set to be prior to the minimum rank of the characteristic period and setting new ranks to obtain the adjusted data, wherein new ranks of the dummy sample set in the adjusted data are set from 1, and new ranks of the reversed characteristic period are set from maximum rank of dummy sample set in the adjusted data plus 1.

7. The nonparametric method according to claim 1, wherein after the step of setting the characteristic period based on the minimum rank and the maximum rank, the nonparametric method further comprises:
  if the characteristic period does not include the sample that belongs to the reference group, setting the dummy sample set to succeed the maximum rank of the characteristic period and setting new ranks to obtain the adjusted data, wherein each of new ranks of the dummy sample set in the adjusted data is obtained by adding the maximum rank of the characteristic period and each of initial rank of the dummy sample, or setting the dummy sample set to be prior to the minimum rank of the characteristic period and setting new ranks to obtain the adjusted data, wherein new ranks of the dummy sample set in the adjusted data are set from 1, and new ranks of the characteristic period are set from a value obtained by adding 1 and maximum rank of dummy sample set in the adjusted data.

* * * * *